United States Patent
Alexander et al.

(10) Patent No.: US 7,502,194 B2
(45) Date of Patent: Mar. 10, 2009

(54) HEAD-DISC CONTACT DETECTION USING A MICROACTUATOR

(75) Inventors: James C. Alexander, Boulder, CO (US); Jason H. Laks, Westminster, CO (US)

(73) Assignee: Seagate Technology LLC, Scotts Valley, CA (US)

( * ) Notice: Subject to any disclaimer, the term of this patent is extended or adjusted under 35 U.S.C. 154(b) by 0 days.

(21) Appl. No.: 11/693,458

(22) Filed: Mar. 29, 2007

(65) Prior Publication Data
US 2008/0013201 A1    Jan. 17, 2008

Related U.S. Application Data

(60) Provisional application No. 60/743,925, filed on Mar. 29, 2006.

(51) Int. Cl.
*G11B 21/02* (2006.01)
(52) U.S. Cl. ...................................... 360/75
(58) Field of Classification Search ............ 360/75, 360/78.05, 25, 60, 78.12, 234.7, 264.4; 369/44.23
See application file for complete search history.

(56) References Cited

U.S. PATENT DOCUMENTS

| | | | | |
|---|---|---|---|---|
| 6,125,008 A * | 9/2000 | Berg et al. | ............... | 360/264.4 |
| 6,563,665 B1 * | 5/2003 | Ell | ............. | 360/78.05 |
| 6,580,572 B1 * | 6/2003 | Yao et al. | .................. | 360/25 |
| 6,724,563 B2 * | 4/2004 | Kobayashi et al. | ....... | 360/78.05 |
| 6,822,821 B2 * | 11/2004 | Gan et al. | ................. | 360/75 |
| 6,829,119 B2 * | 12/2004 | Bonin et al. | ............. | 360/78.12 |
| 6,898,039 B2 * | 5/2005 | Kobayashi et al. | ........... | 360/60 |
| 7,190,547 B2 * | 3/2007 | Khurshudov et al. | .......... | 360/75 |
| 2003/0142597 A1 * | 7/2003 | Park et al. | ................ | 369/44.23 |
| 2004/0080861 A1 * | 4/2004 | Bonin et al. | ............. | 360/78.05 |
| 2006/0023339 A1 * | 2/2006 | Fukuyama et al. | ........... | 360/75 |
| 2006/0245110 A1 * | 11/2006 | Hanchi et al. | ............ | 360/234.7 |

* cited by examiner

*Primary Examiner*—Fred Tzeng
(74) *Attorney, Agent, or Firm*—Shumaker & Sieffert, P.A.

(57) ABSTRACT

A method for detecting head-disc contact in a disc drive is disclosed. The method comprises monitoring an output signal from a head positioning microactuator on a read/write head in the disc drive and evaluating the output signal to determine if the read/write head contacts a disc of the disc drive.

22 Claims, 4 Drawing Sheets

HEAD-DISC CONTACT DETECTION USING A MICROACTUATOR

This application claims the benefit of U.S. Provisional Application No. 60/743,925, filed Mar. 29, 2006, the entire content of which is incorporated herein by reference.

BACKGROUND

During the assembly process of a disc drive, the placement of the read/write heads on the disc is a critical operation. During this operation, is important to prevent damage to both the heads and the disc, e.g., damage from head-disc contact. The placement of the read/write heads on the disc typically occurs at a separate station in a disc drive manufacture assembly line, called a head merge station. The head merge station includes a head merge tool. A variety of head merge tools are currently available, including static and dynamic head merge tools. Other types of head merge tools are also available, including space merge head merge tools.

Dynamic head merge tools locate heads directly on spinning discs mounted to a baseplate of the disc drive; whereas static head merge tools locate the heads on stationary discs. In space merge tools, a head is located proximate to the disc, prior to mounting the disc or actuator assembly to the disc drive baseplate. In different examples of head merge tools, heads may be moved to a parked position via a disc drive actuator arm voice coil motor, while a disc drive spindle motor rotates the discs. In other examples, head merge tools may be used to locate the heads directly to parked positions such that powering the disc drive spindle motor and/or actuator arm voice coil motor may not be necessary at the head merge station.

SUMMARY

In one embodiment, the invention is directed to a method for detecting head-disc contact in a disc drive. The method comprises monitoring an output signal from a head positioning microactuator on a read/write head in the disc drive; and evaluating the output signal to determine if the read/write head contacts a disc of the disc drive.

The details of one or more embodiments of the invention are set forth in the accompanying drawings and the description below. Other features, objects, and advantages of the invention will be apparent from the description and drawings, and from the claims.

DETAILED DESCRIPTION

Head merge stations can go out of calibration during the manufacturing of a plurality of disc drives in a disc drive manufacture assembly line. If a head merge station goes out of calibration, some heads may contact discs during the head merge process. This can result in damage to the discs or the heads, thereby reducing the reliability of a disc drive. In some cases, this damage can reduce the reliability of the disc drive enough to cause customer returns and/or self-test failures. Many disc drives may be produced after a head merge station goes out of calibration because it is difficult to determine if a head merge station is out of calibration during the disc drive assembly process.

In general, the invention relates to techniques for detection of head-disc contact during head merge operations. For example, a head merge station may include a circuit that is connected to head positioning microactuators during the head merge operation. Piezoelectric head positioning microactuators commonly used in disc drives produce an electrical signal in response to a deflection caused by head-disc contact. By identifying these electrical signals, head disc contact can be reliably detected. Following detection of head-disc contact, maintenance may be performed on a head merge station before any other disc drives are assembled using that head merge station to prevent additional head-disc contact.

Figure 1:
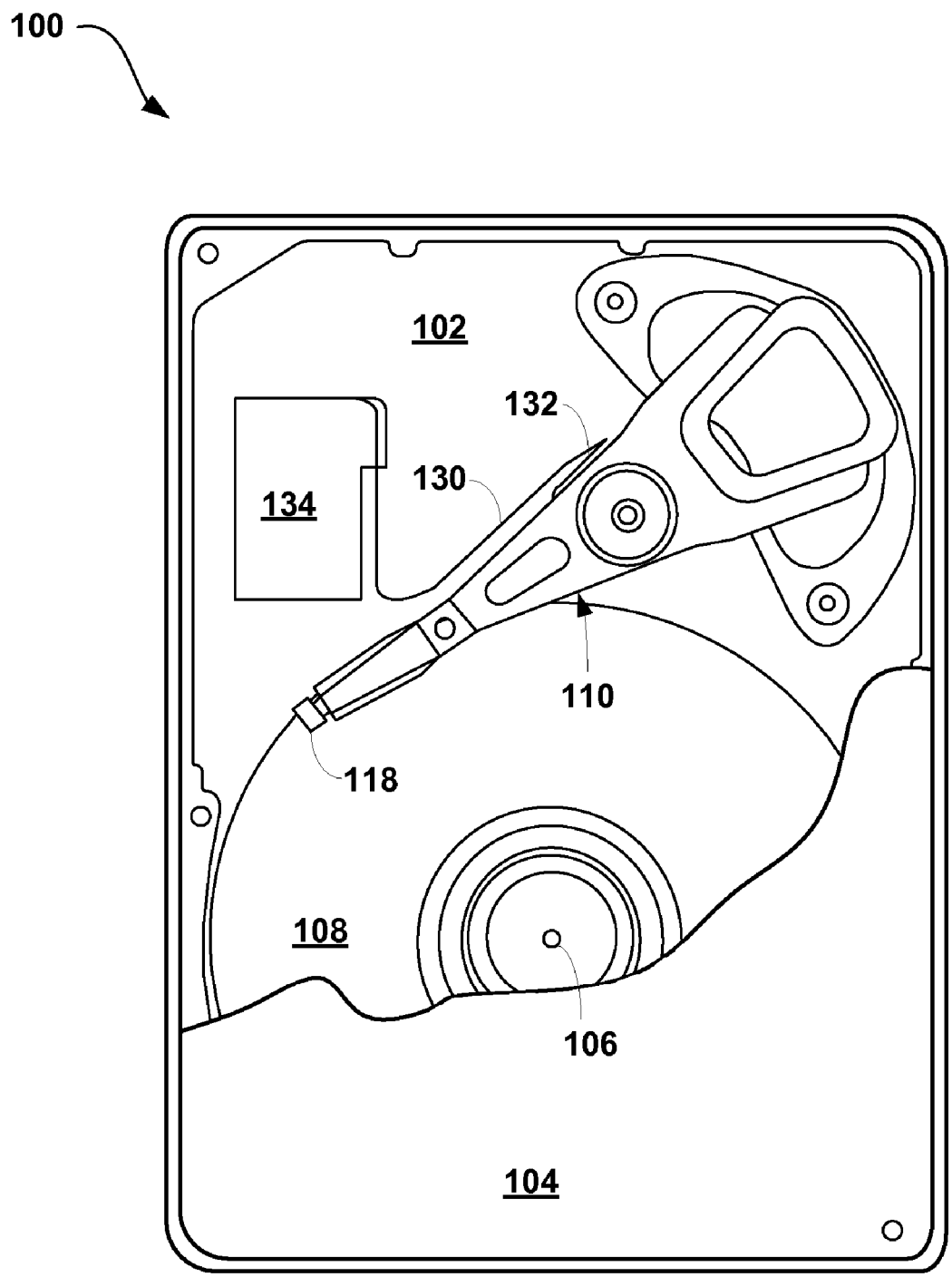
FIG. 1 is an illustration of a disc drive including a head positioning microactuator.

FIG. 1 is an illustration of exemplary disc drive 100, which includes at least one head positioning microactuator that may be used to detect head-disc contact, e.g., contact during a head merge operation during the assembly of disc drive 100. Cover 104, shown partially cut away, cooperates with base 102 to form a housing that defines an internal environment of disc drive 100. Disc drive 100 also includes recordable magnetic disc 108, spindle motor 106 and actuator assembly 110 with head 118. While disc drive 100 only shows a single disc 108 and a single head 118, disc drive 100 optionally includes additional discs 108 and heads 118. Each head 118 may be associated with one or more microactuators used for fine positioning of heads 118 relative to data tracts on discs 108. One or more of these microactuators may be used to detect head-disc contact during a head merge operation during the assembly of disc drive 100.

Spindle motor 106 operates to rotate disc 108. Actuator assembly 110 pivots about bearing shaft assembly 112 moving head 118 across media tracks of disc 108. Flex assembly 130 provides electrical connection paths to control actuator assembly 110 and allows pivotal movement of actuator assembly 110 during operation. Printed circuit board 132 controls read and write operations of head 118. Flex assembly 130 terminates at flex bracket 134.

Figure 2:
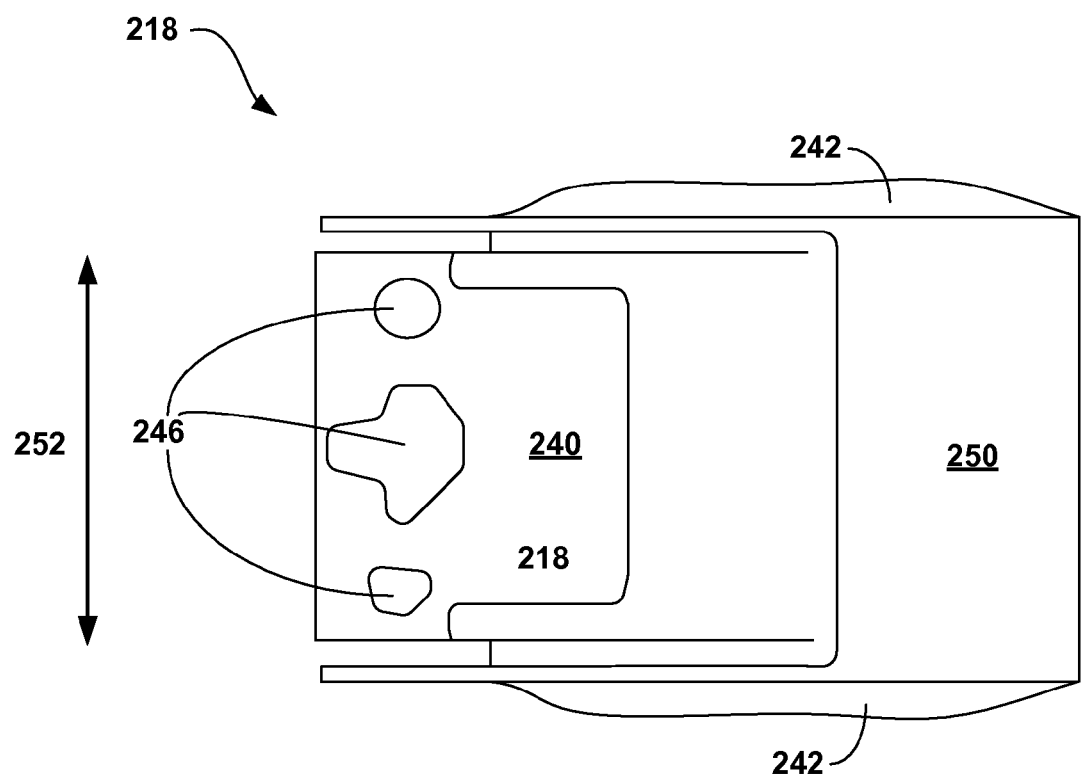
FIG. 2 is a close-up illustration of a disc drive read/write head.

FIG. 2 is a close-up illustration of disc drive read/write head 218. For example, read/write head 218 may be the same as read/write head 118 of data storage disc 100 in FIG. 1. Read/write head 218 includes flexible U-frame 250. Read/write elements 246 are integrated with slider 240. Piezoelectric microactuators 242 operate to flex U-frame 250 in order to move read/write elements 246 along line 252 during read and write operations. Piezoelectric microactuators 242 may be used to position read/write elements 246 accurately relative to data tracks on a data storage disc (not shown).

Piezoelectric microactuators 242 may also be used to measure defections in flexible U-frame 250. For example, a head merge station may include a circuit that is connected to piezoelectric microactuators 242 during a head merge operation in the production of a disc drive. Piezoelectric microactuators 242 produce an electrical signal in response to a deflection, such as a defection occurring when read/write head 218 contacts a data storage disc (not shown). The electrical signal may be detected using the same electrical connection path used to power piezoelectric microactuators 242 to finely position read write elements 246. By measuring electrical signals from piezoelectric microactuators 242, contact between read/write head 218 and a data storage disc can be reliably detected. Detecting such contact may be useful, e.g., to determine when maintenance of a head merge station is required to prevent damage to disc drives during the head merge process.

Figure 3:
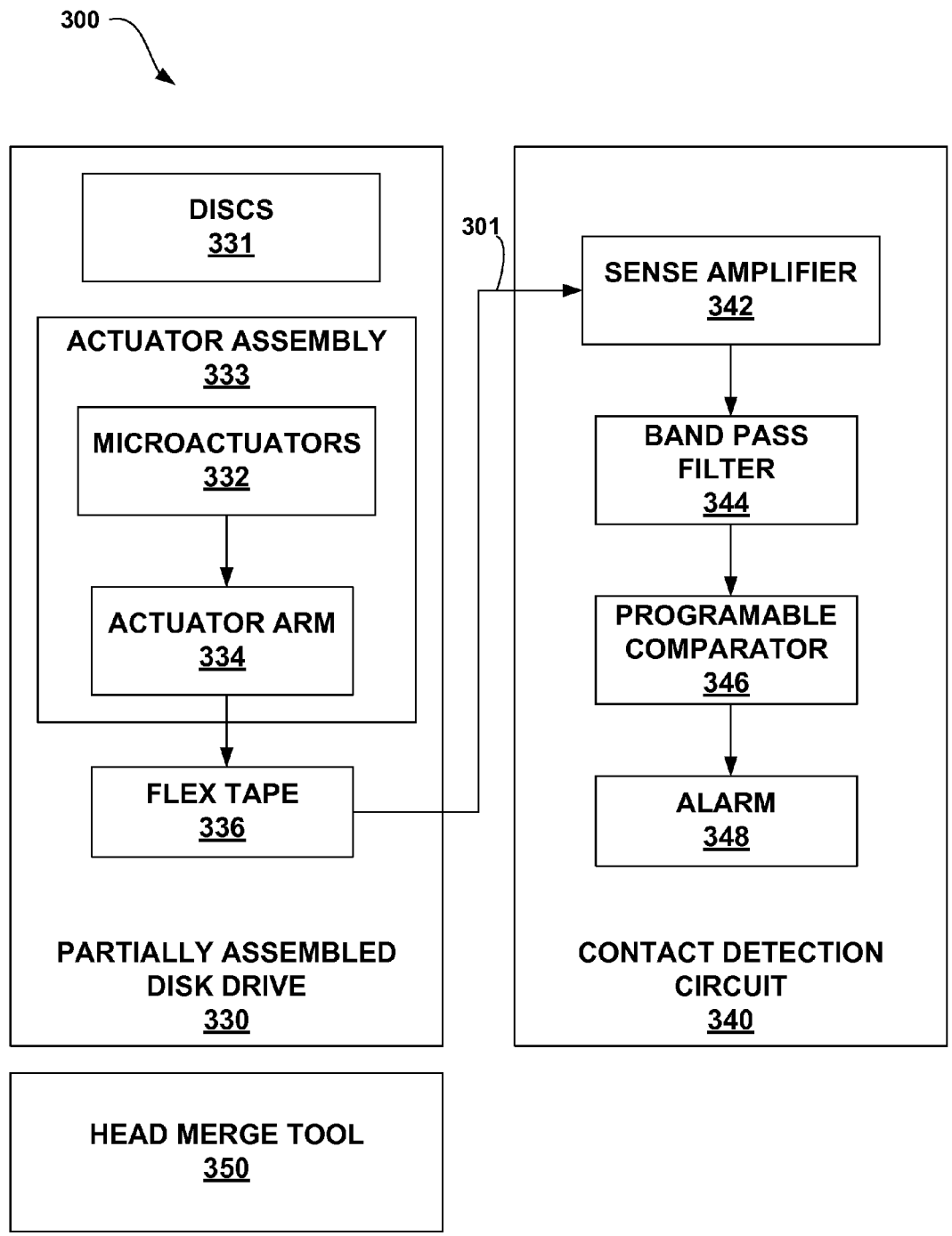
FIG. 3 is a conceptual block diagram illustrating a signal path for an exemplary head-disc contact detection circuit at a head merge station.

FIG. 3 is a conceptual block diagram illustrating signal path 301 for an exemplary head-disc contact detection circuit at head merge station 300. Signal path 301 includes partially-assembled disc drive 330 and contact detection circuit 340. Head merge station 300 also includes head merge tool 350. For example, head merge tool 350 may be a dynamic head merge tool, a static head merge tool or other head merge tool.

Signal path 301 begins with head positioning microactuators 332, which are in electrical communication with flex tape 336 via actuator arm 334. Microactuators 332 move in response to an electrical signal and, conversely, generate an electrical signal in response to deflection. For example, microactuators 332 may comprise one or more piezoelectric crystals, and/or other microactuation mechanisms that generate electrical signals in response to deflection. Contact detection circuit 340 is in electrical communication with head positioning microactuators 332 via flex tape 336 and actuator arm 334 of partially-assembled disc drive 330.

Partially-assembled disc drive 330 includes one or more discs 331. Each of discs 331 include one or more data storage surfaces, e.g., magnetically recordable data storage surfaces. Partially-assembled disc drive 330 also includes actuator assembly 333 and flex tape 336. Actuator assembly 333 includes actuator arm 334 and one or more read/write heads for each of the data storage surfaces of discs 331, the read/write heads each including one or more head positioning microactuators 332.

Contact detection circuit 340 optionally includes sense amplifier 342, which amplifies signals received from head positioning microactuators 332. Contact detection circuit 340 also optionally includes band pass filter 344, which may isolate portions of output signals from head positioning microactuators 332 that indicate head-disc contact. For example, band pass filter 344 may isolate a first sway mode of head positioning microactuators 332. In one example, a first sway mode of head positioning microactuators 332 may be between 10 kilohertz and 30 kilohertz, e.g., a first sway mode of head positioning microactuators 332 may be approximately 19 kilohertz.

Contact detection circuit 340 includes programmable comparator 346 that evaluates the output signal from head positioning microactuators 332 received from signal path 301 to determine if head-disc contact occurs in partially-assembled disc drive 330 during the head merge operation. Contact detection circuit 340 also includes alarm 348 which indicates the occurrence of head-disc contact occurs in partially-assembled disc drive 330. For example, alarm 348 may be a visible or audible alarm. As another example, alarm 348 may be a stop switch that prevents operation head merge tool 350 until an operator resets alarm 348, e.g., after performing a maintenance operation on head merge tool 350 to prevent additional head-disc contact. As another example, alarm 348 may comprise a computing device that sends notice of the head disc contact to a remote computing device via a network, such as a local area network or the Internet. Other embodiments of alarm 348 are also possible.

In some embodiments, contact detection circuit 340 may include a plurality of channels corresponding to each of microactuators 332. For example, if head-disc contact event occurs, contact detection circuit 340 may be able to determine at which of microactuators 332 head-disc contact occurred.

Figure 4:
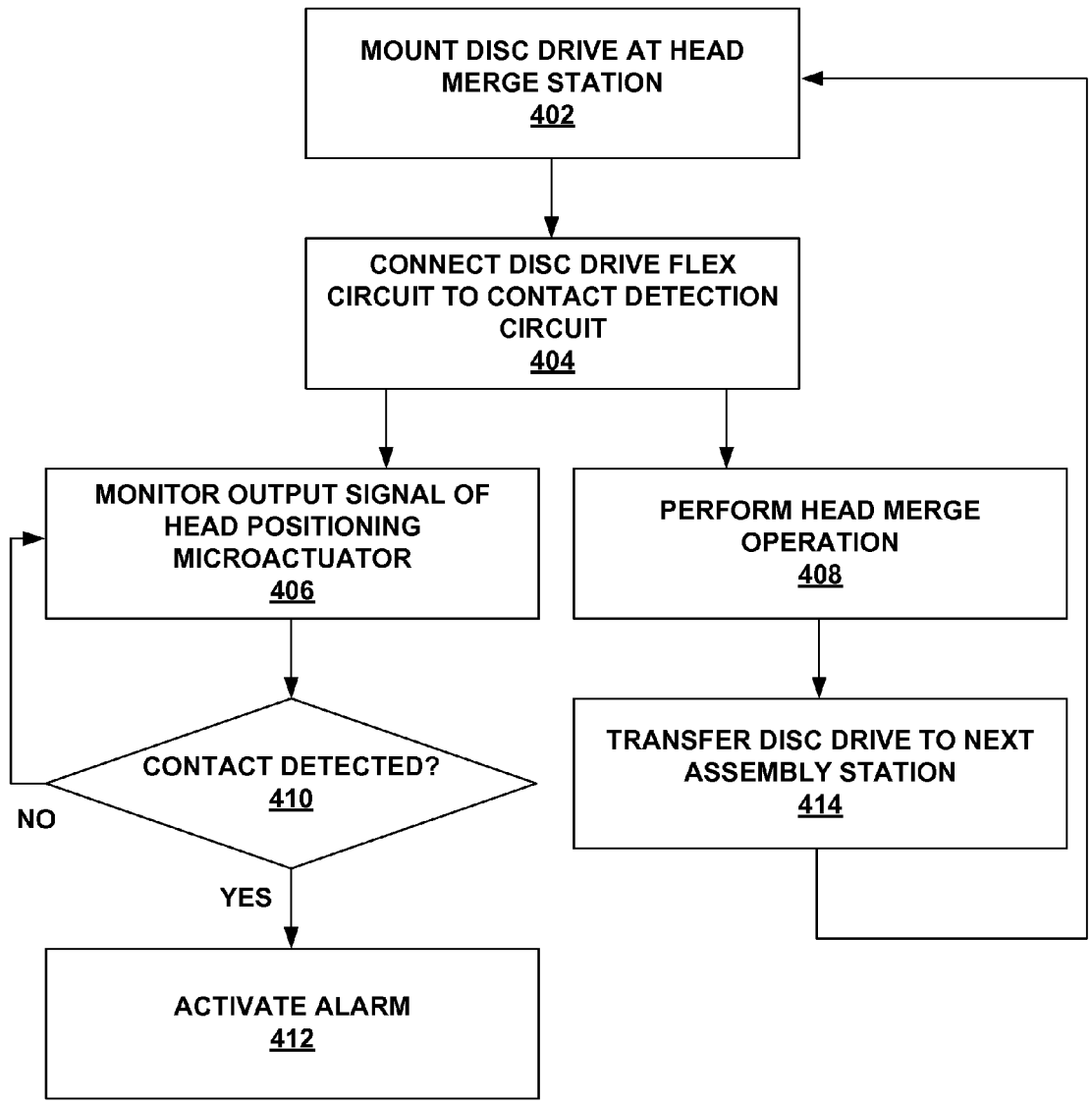
FIG. 4 is a flowchart illustrating exemplary techniques for detecting head-disc contact using a head positioning microactuator.

FIG. 4 is a flowchart illustrating exemplary techniques for detecting head-disc contact using a head positioning microactuator during manufacturing a plurality of disc drives. For clarity, the techniques illustrated in FIG. 4 are described with respect to head merge station 300 of FIG. 3.

First, disc drive 330 is mounted at head merge station 300, which includes contact detection circuit 340, e.g., by an operator or an automated system (402). The process of mounting disc drive 330 at head merge station 300 may include, e.g., a process of precisely positioning and aligning disc drive 330 relative to head merge tool 350 and fixedly securing disc drive 330 to maintain its position and alignment during a subsequent head merge operation using head merge tool 350.

Next, contact detection circuit 340 is electrically connected to flex tape 336 to form an electrical connection between contact detection circuit 340 and head positioning microactuators 332 (404). Contact detection circuit 340 monitors an output signal of the head positioning microactuators 332 (406). Head merge tool 350 performs a head merge operation to position the read/write heads on discs 331 while monitoring the output signal with contact detection circuit 340 (408). Contact detection circuit 340 evaluates the output signal of head positioning microactuators 332 while head merge tool 350 performs the head merge operation to determine whether a read/write head contacts one of discs 331 (410). In the event one of the read/write heads contacts one of discs 331, contact detection circuit 340 activates alarm 348 (412). Following activation of alarm 348, an operator may perform maintenance on head merge station 300 before prior to head merge tool 350 performs the head merge operation on any additional disc drives.

Following the head merge operation, disc drive 330 is released from head merge station 300 and transferred to the next assembly station in the disc drive manufacture assembly line (414). Another disc drive in the plurality of disc drives is then mounted at head merge station 300 (402). The techniques described with respect to FIG. 4 are then repeated for each of the plurality of disc drives.

Various embodiments of the invention have been described. However, various modifications to the described embodiments may be made within the scope of the invention. For example, piezoelectric microactuators are described, but the described techniques may be useful with any microactuator that generates electrical signals in response to deflection. These and other embodiments are within the scope of the following claims.

The invention claimed is:

1. A method of manufacturing a plurality of disc drives, wherein manufacturing each of the plurality of disc drives comprises:
   mounting a disc drive at a head merge station that includes a contact detection circuit;
   forming an electrical connection between the contact detection circuit and a head positioning microactuator on a read/write head in the disc drive;
   monitoring an output signal of the head positioning microactuator with the contact detection circuit;
   performing a head merge operation to position the read/write head on a disc of the disc drive while monitoring the output signal with the contact detection circuit; and
   evaluating the output signal with the contact detection circuit to determine whether the read/write head contacts a disc of the disc drive.

2. The method of claim 1, wherein manufacturing each of the plurality of disc drives further comprises initiating an alarm if the read/write head contacts a disc of the disc drive.

3. The method of claim 1, wherein manufacturing each of the plurality of disc drives further comprises performing maintenance on the head merge station if the read/write head contacts a disc of the disc drive prior to performing the head merge operation on any additional disc drives in the plurality of disc drives.

4. The method of claim 1, wherein the head positioning microactuator comprises a piezoelectric microactuator.

5. The method of claim 1, wherein the electrical connection includes a flex tape of the disc drive.

6. The method of claim 1, wherein the contact detection circuit includes a programmable comparator to evaluate the output signal.

7. A method for detecting head-disc contact in a disc drive comprising:
    monitoring an output signal from a head positioning microactuator on a read/write head in the disc drive; and
    evaluating the output signal to determine if the read/write head contacts a disc of the disc drivel,
    wherein the disc drive is a partially-assembled disc drive.

8. The method of claim 7, further comprising performing a head merge operation to position the read/write head on the disc while monitoring the output signal.

9. The method of claim 8, wherein performing a head merge operation comprises using a static head merge tool to position the read/write head on the disc.

10. The method of claim 7, further comprising initiating an alarm if head-disc contact is detected.

11. The method of claim 7, wherein evaluating the output signal comprises filtering the output signal with a band-pass filter.

12. The method of claim 11, wherein filtering the output signal comprises isolating a first sway mode of the microactuator.

13. The method of claim 7, wherein the head positioning microactuator is a piezoelectric microactuator.

14. The method of claim 7, wherein the disc drive is one of a plurality of disc drives, wherein the method comprises:
    monitoring output signals from head positioning microactuators on read/write heads for each of the plurality disc drives with a single contact detection circuit; and
    evaluating output signals to determine if head-disc contact occurs in any of the plurality disc drives.

15. An assembly comprising:
    a partially-assembled disc drive including,
        one or more discs, each disc including one or more data storage surfaces,
        an actuator assembly including one or more read/write heads for each of the data storage surfaces, and
        one or more head positioning microactuators for each of one or more read/write heads; and
    a contact detection circuit in electrical communication with the one or more head positioning microactuators, the contact detection circuit including,
        a comparator that evaluates an output signal from the one or more head positioning microactuators to determine if any of the one or more read/write heads contacts any of the one or more discs.

16. The assembly of claim 15, further comprising a head merge tool that positions the one or more read/write heads on the one or more discs while the contact detection circuit monitors the output signal.

17. The assembly of claim 16, wherein the head merge tool is a static head merge tool.

18. The assembly of claim 15, wherein the contact detection circuit further includes:
    a sense amplifier that receives the output signal;
    a band pass filter that isolates a first sway mode of the one or more microactuators; and
    an alarm that activates if any of the one or more read/write heads contacts any of the one or more discs.

19. The assembly of claim 15, wherein the partially-assembled disc drive further includes:
    a spindle motor operable to rotate the one or more discs about a common axis; and
    a flex circuit that transmits the output signal from the actuator assembly to the contact detection circuit.

20. The assembly of claim 15, wherein the one or more microactuators include a piezoelectric microactuator.

21. A contact detection circuit configured for electrical communication with a disc drive head positioning microactuator during an assembly process of a disc drive, the contact detection circuit comprising:
    a comparator that evaluates an output signal from the disc drive head positioning microactuator to determine a read/write head including the disc drive head positioning microactuator contacts a disc of the disc drive; and
    an alarm that activates if any of the read/write head contacts the disc.

22. The contact detection circuit of claim 21, wherein the contact detection circuit is part of a disc drive assembly station.

* * * * *